United States Patent Office 3,222,121
Patented Dec. 7, 1965

---

3,222,121
PREPARATION OF SODIUM BOROHYDRIDES
Herbert Jenkner, Cologne-Deutz, and Hans Werner Schmidt, Hannover, Germany, assignors to Kali-Chemie Aktiengesellschaft, Hannover, Germany
No Drawing. Filed Oct. 31, 1960, Ser. No. 65,894
Claims priority, application Germany, Oct. 30, 1959, K 39,049
The portion of the term of the patent subsequent to June 13, 1978, has been disclaimed
5 Claims. (Cl. 23—14)

This application is a continuation-in-part of our application, Serial No. 748,144, filed July 14, 1958, now U.S. Patent 2,988,427.

The invention relates to the preparation of sodium borohydrides.

Schlesinger et al. (J. Am. Chem. Soc., vol. 75 (1953), p. 199–204) had already attempted to prepare alkali metal borohydrides from an alkali metal hydride and diborane. They succeeded in obtaining lithium borohydride by reaction of lithium hydride with diborane when the reaction was carried out in a solvent, particularly ether. However, they could not accomplish a reaction of diborane with sodium hydride, even though using solvents or applying elevated temperatures.

I have found that sodium borohydrides such as $NaBH_4$, $NaB_2H_7$ or higher homologues thereof, can be readily prepared from sodium hydride and boron hydrides, such as diborane and higher boron hydrides, if the sodium hydride is activated by an organoboron compound.

Such organoboron compounds, here designated activators, are particularly boron trialkyls, boric acid esters, alkyl borohydrides, alkoxy borohydrides, alkyl boric acid esters. Preferably, the alkyl groups of such compounds have only few carbon atoms, such as methyl, ethyl, and propyl, as the reaction times increase with increasing number of carbon atoms. Suitable activators are for instance boron triethyl, boron tripropyl, dimethoxy borohydride, ethyl methoxy borohydride or methoxy boron diethyl.

The organoboron compounds may be prepared within the reaction mixture, for instance from organoaluminum compounds and boron hydrides, or even boron halides.

In addition to the recited compounds, also their complex and addition compounds may be used, for instance their etherates or aminates.

The activators are effective already in very small amounts, from 0.1 to 5 mole percent, calculated on sodium hydride. In their presence, the reaction is almost quantitative. Generally, there is no advantage in using more than 30 mole percent.

The reaction has to be carried out with the precautions well-known for reactions involving diborane—that is, with the exclusion of air and moisture in an inert gas such as nitrogen. It is of advantage to use a solvent or suspending medium from which the sodium borohydride may be recovered by centrifuging, or by decanting or distilling off the solvent or suspending medium. Such solvents or suspending media, for example aliphatic or aromatic hydrocarbons, ethers, organic silanes or silicon tetralkyl, must be indifferent against the starting materials.

As the reaction proceeds according to the equation $$2NaH + B_2H_6 \rightarrow 2NaBH_4$$

without the formation of by-products, the residue remaining after centrifuging or removal of the solvent or suspending liquid is the desired end product. If an end product of high purity is desired, halogen-free boron hydride preferably in excess must be used, because otherwise sodium halide would contaminate the sodium borohydride. The presence of halogen could also affect the activation of the sodium hydride.

The reaction proceeds satisfactorily at temperatures below 100° C., down to 50° C. In cases where the reaction is slow, temperatures up to 200° C. may be used.

The process of the invention may be combined with my process for the preparation of boron hydrides by reaction of an organosilane of the formula $R_xSiH_{4-x}$, wherein R is methyl, ethyl, or propyl, and $x$ is an integer from 1 to 3, with boron trichloride, as disclosed in my copending application, Ser. No. 53,368, filed Sept. 1, 1960. The boron hydride obtained in said reaction can be reacted directly with activated sodium hydride, whereby unreacted boron trichloride should be removed prior to the reaction, for instance by a purification trap containing N-trialkyl borazan.

Example 1

A suspension of 5.4 parts by weight of finely divided sodium hydride in 200 parts by weight of octane were heated to 80° C. and activated with 2 parts by weight of an ethyl borohydride of the approximate composition of $(C_2H_5)_2BH$. Thereafter diborane was introduced until nothing more was absorbed (about 110 percent of theory).

The originally grey suspension decolorized and brightened during reaction. After cooling the octane diethyl borohydride mixture was distilled, the reaction residue was washed with petroleum ether and then dried.

10 parts by weight of sodium borohydride were obtained in which, according to the analysis, the ratio of Na:B:H was 1:1:4 which corresponds to theory.

Example 2

5 parts by weight of a 98 percent sodium hydride were wet ground with 200 parts by weight octane. This suspension was given into the reaction vessel and activated with 2 parts by weight boron triethyl. At this temperature diborane in excess of 115 percent of theory was introduced into the reaction mixture. After completion of the diborane addition the formed precipitate was filtered off, washed by light benzine and dried. 8 parts by weight sodium borohydride were obtained.

We claim:
1. A process for the preparation of sodium borohydrides comprising reacting sodium hydride at a temperature of 50 to 200° C. with diborane in the presence of at least 0.1 mole percent, calculated on the sodium hydride, of an organoboron compound as activator, said organoboron compound having the composition $BH_xR_yR'_z$, wherein R is lower alkyl, R' is lower alkoxy, $x$ is an integer from 0 to 2, $y$ and $z$ are integers from 0 to 3, and $x+y+z=3$.
2. The process claimed in claim 1 wherein the organoboron compound is present in an amount of 0.1 to 30 mole percent calculated on the sodium hydride.
3. The process claimed in claim 2 wherein the organoboron compound is present in an amount of about 0.5 to 5 mole percent, calculated on sodium hydride.
4. The process as claimed in claim 1 wherein ethyl borine is used as activator.

5. The process as claimed in claim 1 wherein the reaction is carried out at a temperature of 50 to 100° C.

References Cited by the Examiner

UNITED STATES PATENTS

| | | | |
|---|---|---|---|
| 2,796,328 | 6/1957 | Jackson et al. | 23—14 |
| 2,796,329 | 6/1957 | Jackson et al. | 23—14 |
| 2,955,911 | 11/1960 | Edwards et al. | 23—14 |
| 2,988,427 | 6/1961 | Jenkner et al. | 23—14 X |
| 2,955,911 | 11/1960 | Edwards et al. | 23—14 |
| 3,029,128 | 4/1962 | Chamberlain | 23—14 |

FOREIGN PATENTS

| | | |
|---|---|---|
| 1,204,724 | 8/1959 | France. |
| 1,058,478 | 6/1959 | Germany. |
| 1,079,008 | 4/1960 | Germany. |
| 1,072,597 | 1/1960 | Germany. |

OTHER REFERENCES

Schaeffer et al.: "Journal of the American Chemical Society," vol. 81, page 3486, July 1959.

MAURICE A. BRINDISI, *Primary Examiner.*